No. 818,495. PATENTED APR. 24, 1906.
A. K. WARREN.
SYSTEM OF OPERATING RAILROAD SWITCHES.
APPLICATION FILED JUNE 24, 1905.
5 SHEETS—SHEET 2.
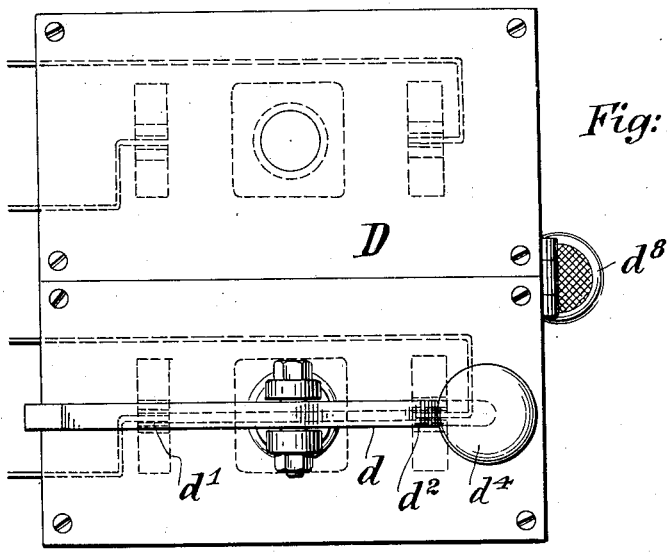
Fig: 2.
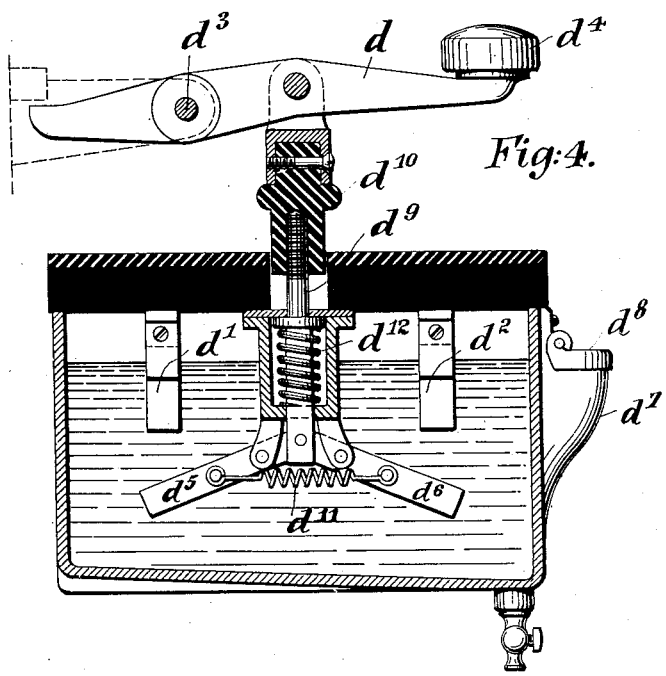
Fig: 4.
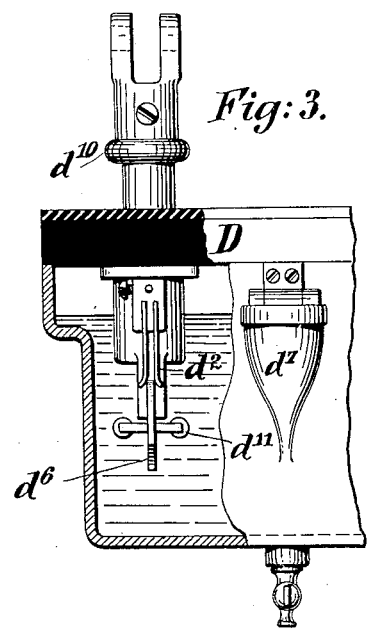
Fig: 3.
WITNESSES:
Lucius E. Varney
A. N. Jesbera
INVENTOR
Aldred K. Warren
BY
Redding, Kiddle & Greeley
ATTORNEYS

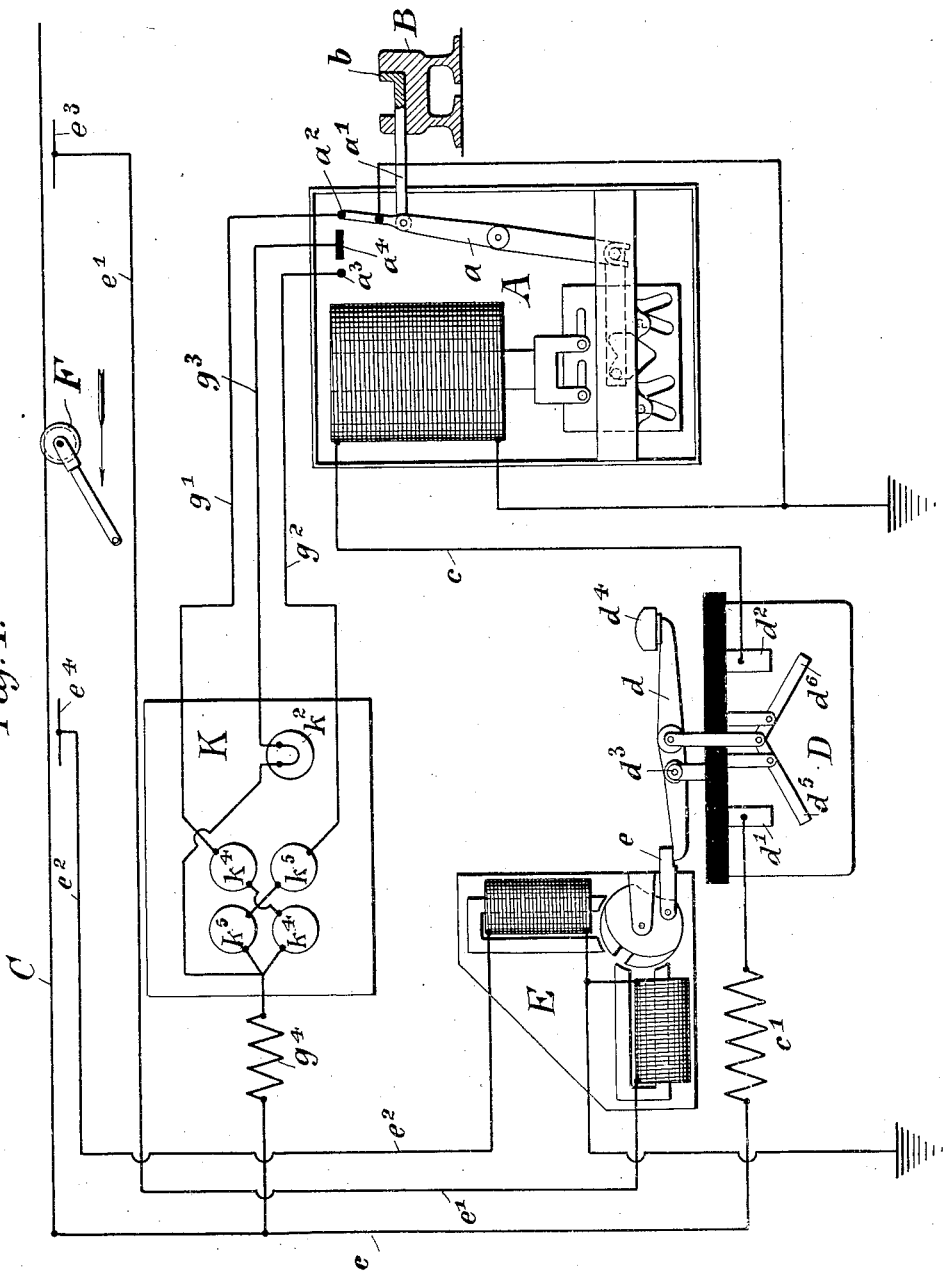

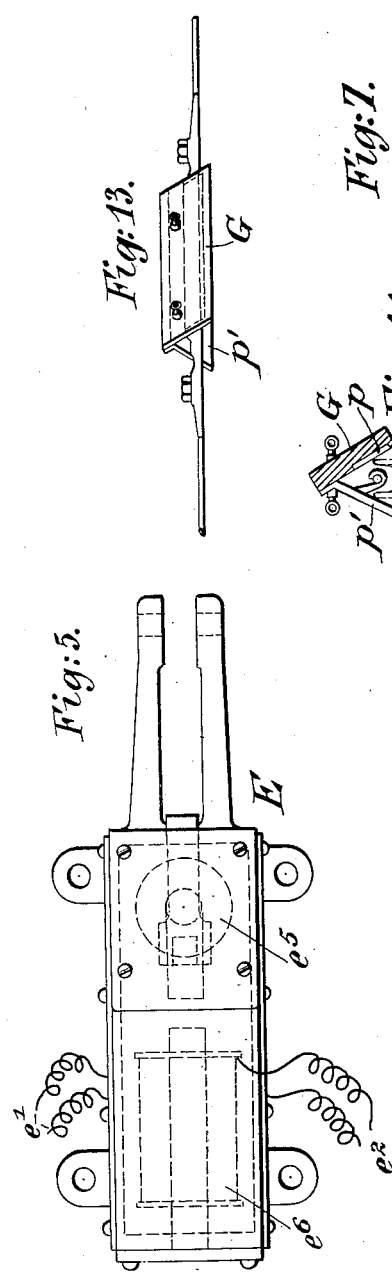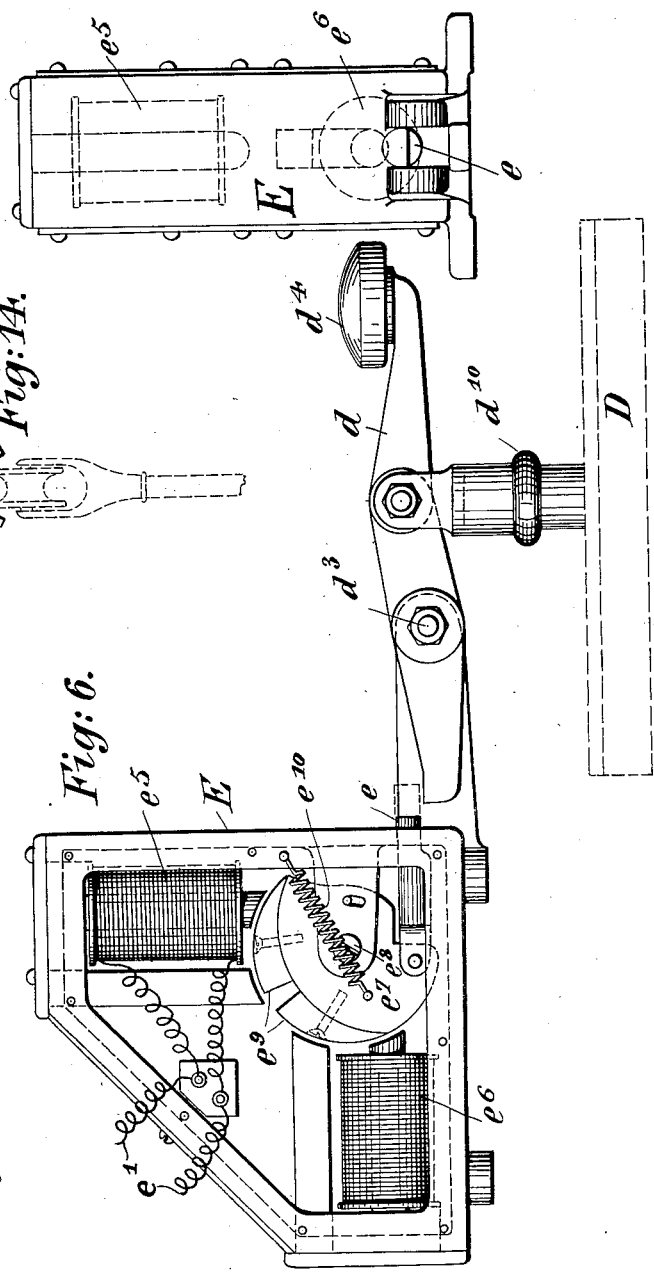

No. 818,495. PATENTED APR. 24, 1906.
A. K. WARREN.
SYSTEM OF OPERATING RAILROAD SWITCHES.
APPLICATION FILED JUNE 24, 1905.
5 SHEETS—SHEET 4.
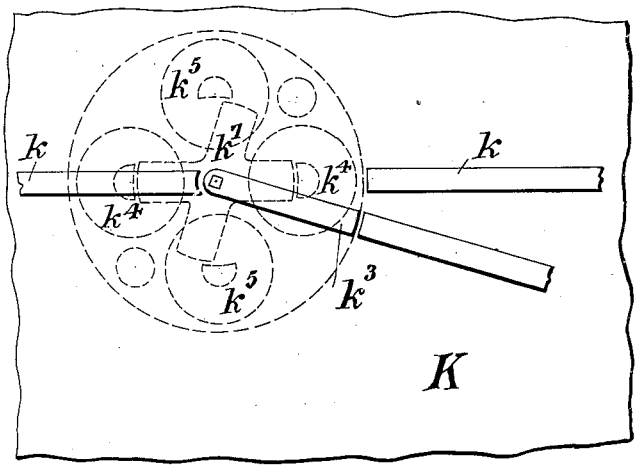
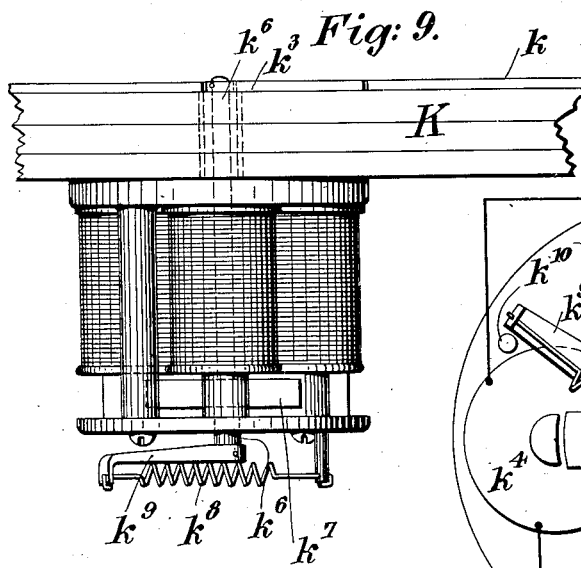
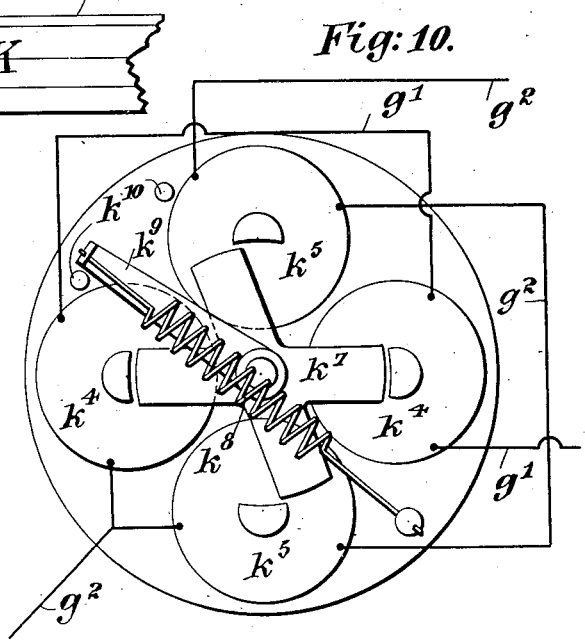
WITNESSES:
INVENTOR
Aldred K. Warren
BY
ATTORNEYS No. 818,495. PATENTED APR. 24, 1906.
A. K. WARREN.
SYSTEM OF OPERATING RAILROAD SWITCHES.
APPLICATION FILED JUNE 24, 1905.
5 SHEETS—SHEET 5.
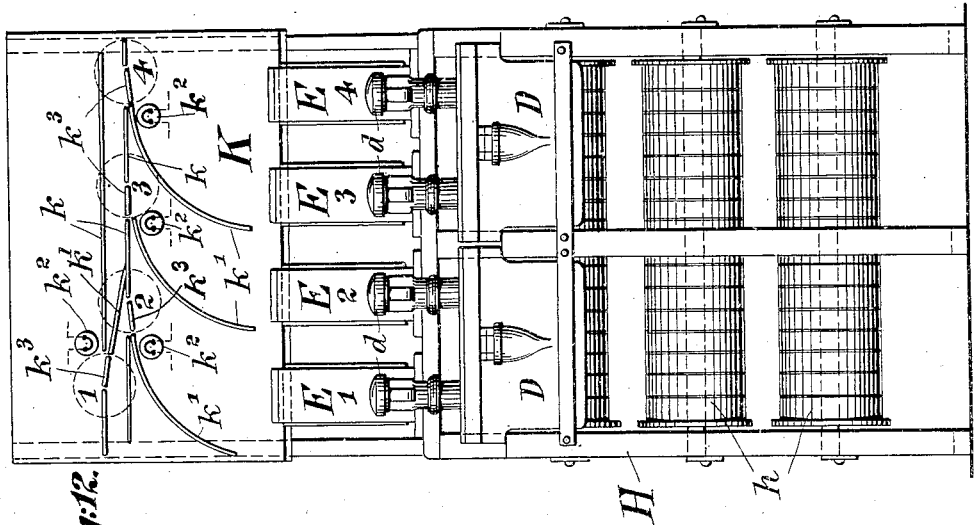
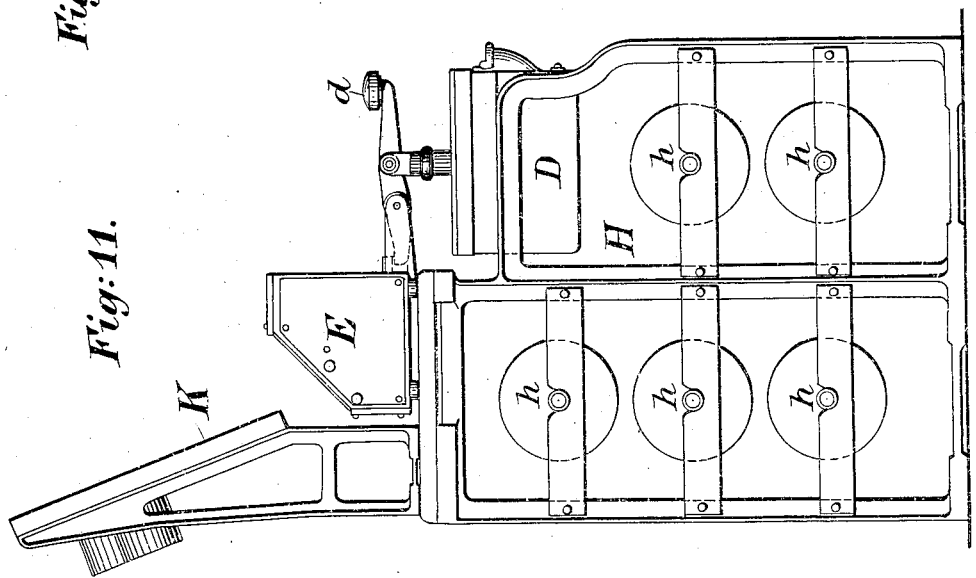

UNITED STATES PATENT OFFICE.

ALDRED K. WARREN, OF NEW YORK, N. Y., ASSIGNOR TO AMERICAN AUTOMATIC SWITCH COMPANY, OF NEW YORK, N. Y., A CORPORATION OF NEW YORK.

SYSTEM OF OPERATING RAILROAD-SWITCHES.

No. 818,495.  Specification of Letters Patent.  Patented April 24, 1906.

Application filed June 24, 1905. Serial No. 266,702.

*To all whom it may concern:*

Be it known that I, ALDRED K. WARREN, a subject of the King of Great Britain, and a resident of the borough of Manhattan, in the city of New York, in the county and State of New York, have invented certain new and useful Improvements in Systems of Operating Railroad-Switches, of which the following is a specification, reference being had to the accompanying drawings, forming a part hereof.

This invention has for its general object the provision of a practical system of operating railroad-switches, which system shall be particularly adapted for use upon electric roads. For want of such a system it is customary upon electric roads at the present time either to employ a man stationed at the switch to throw it mechanically as it is required to be operated or to provide an electric switch which can be thrown automatically from the car, while in many cases neither of these means is provided and the motorman is obliged to stop his car, get out, and throw the switch himself.

While the present system may be applied to the operation of one switch or any number of switches, it is particularly designed to be used where there are several switches near together, so that one man may be able to control all of the switches conveniently from one place.

In carrying out the invention the operator under whose control are the switches to be operated will be stationed at some convenient place, preferably where he can see all of the cars as they approach the switches. Before the operator there will be arranged suitable mechanism for controlling the switches, which are provided with electromagnetic throwing devices electrically connected with the controlling mechanism. Furthermore, in accordance with the invention an indicator is provided for the operator, whereby he is able to tell the exact position of all the switches and also whether or not all of the switches have been properly thrown. Again, in order to prevent the throwing of a switch if the car has started over it and before the car has passed completely over it a locking device controlled automatically by the car itself is provided to prevent the controller mechanism from being operated for the time being.

The invention also consists in providing apparatus suitable for putting the improved system into operation, all of which will be referred to in detail hereinafter and in connection with the description of the system and also of the drawings, in which—

Figure 1 is a diagrammatic view of one embodiment of the system. Figs. 2, 3, and 4 are respectively plan, front, and sectional views of an electric switch mechanism which may be employed in the system, Fig. 3 being broken away to show the interior of the switch-box and Fig. 4 showing the controller-lever in elevation and in relation to the switch mechanism. Figs. 5, 6, and 7 are respectively plan, side, and end views of an electric lock mechanism which may be employed in the system, Fig. 6 showing one of the side plates of the lock-case removed and also showing the controller-lever in relation to the lock mechanism. Figs. 8, 9, and 10 are detail views of portions of the indicator, showing particularly the mechanism for operating the indicator for one switch. Figs. 11 and 12 are respectively a side and a front elevation of a combined controller and indicator which may be employed in the system, and Figs. 13 and 14 are respectively a view in perspective and an end view of a contact device for the trolley.

Referring to the diagram of Fig. 1, any suitable electromagnetic device is indicated at A for throwing the tongue $b$ of a railroad-switch B, the tongue $b$ being connected to a lever $a$ of the device A by a link $a'$. Current is supplied to operate the device A from any suitable source, preferably from the current-main C, which is shown in the present case as a trolley-wire, and in the conductor $c$ from the main C to the device A is interposed an electric switch D, a resistance $c'$ being also included, if necessary, in the conductor $c$. This electric switch D has a controller-lever $d$ and terminals $d'$ and $d^2$, to which the ends of the conductor $c$ are connected, as shown. The controller-lever is pivoted at $d^3$, and on one end is provided a handle or knob $d^4$, which when depressed by the operator serves to connect the terminals $d'$ and $d^2$ through pivoted arms $d^5$ and $d^6$. At the other end of the lever $d$ is an electric locking device E, having a bolt $e$ adapted to slide back and forth in its casing and across the top of the rear end of the lever $d$, and thus prevent the lever $d$ for the time being from being operated to throw the switch-tongue. The lock mechanism E is provided with power through a circuit $e'$ for throwing the bolt and through a circuit $e^2$ for withdrawing the bolt. Each of these circuits is arranged to be closed by any car which is passing over the switch, and for this purpose the current through these circuits is taken from the main C, the circuit $e'$ having a contact $e^3$ located near the main and in advance of the switch—that is, in such a position with reference to the switch that the control F may close the circuit between the main and such contact before the car has reached the switch. Similarly, the circuit $e^2$ is provided with a contact $e^4$, located on the other side of the switch, so that the trolley will form a bridge from the contact to the main just after the car is completely over the switch. In this way the switch will be locked while the car is passing over it, and the operator cannot throw the switch until the car has passed the switch completely.

In Figs. 13 and 14 is shown a contact-piece G for the trolley-wire. One of these pieces is provided for each of the contacts $e^3$ and $e^4$, these contacts being in the form of plates $p$, secured to said piece. Each piece is provided with a second plate $p'$, to which the trolley-wire is connected. When the trolley passes underneath these pieces, the current is bridged from one plate to the other plate through the trolley, as is clearly indicated in Fig. 14. When the switch is located in either one of its limiting positions, it establishes a current through an indicator K by means of circuits $g'$ and $g^2$, and when the switch has not been completely or properly thrown a current is sent through the indicator through a circuit $g^3$. For this purpose contacts $a^2$, $a^3$, and $a^4$ may be provided in the device A, the contact $a^4$ being preferably a long contact, and the current may be closed through each one respectively by the lever $a$, which is connected with the ground. Current for this purpose may be taken from the main C through conductor $c$, as shown, a suitable resistance being provided, as indicated at $g^4$.

Referring now to Figs. 2, 3, and 4, it will be seen that a double electric switch is shown for operating two railroad-switches. Each of these electric switches may comprise a box or case $d$, adapted to contain oil. (Indicated in Figs. 3 and 4.) Obviously as many of these electric switches may be combined as is desired. Communicating with each compartment is a funnel-shaped opening $d^7$ for introducing oil thereinto and having a perforated cover $d^8$ for permitting the escape of any contained gases. The controller or lever $d$ of each electric switch is connected with a plunger $d^9$, a suitable insulating-piece $d^{10}$ being preferably provided therebetween and the lower end of the plunger engaging the ends of the pivoted arms $d^5$ and $d^6$. These arms are preferably connected by a spring $d^{11}$, which tends to move them quickly over their center, and a spring $d^{12}$ is also provided to press the plunger always upward and is of sufficient strength to keep the plunger and controller in their uppermost position except when depressed by the operator.

Referring to Figs. 5, 6, and 7, it will be seen that the circuit $e'$ runs to and includes a magnet $e^5$, and the circuit $e^2$ runs to and includes a magnet $e^6$, which magnets are arranged substantially with their poles at right angles to each other. At the ends of their poles is a disk $e^7$, pivoted at $e^8$, so as to be disposed approximately between said poles. At the lower end of the disk near its periphery the bolt $e$ is pivoted in such a way as to be drawn into and out of the casing as the disk is turned back and forth. Nearly opposite where the bolt is pivoted a crescent-shaped armature $e^9$ is secured to the periphery of the disk. It is preferable to make this armature in two pieces, as shown in Fig. 6, each piece being screwed or otherwise secured to the disk. In Fig. 6 the thick portion of the armature is shown substantially midway between the poles of the magnets, and it will be obvious that upon the energization of the magnets alternately the thick part of the armature will be drawn from one to the other, thus effecting the reciprocation of the bolt. A spring $e^{10}$ is preferably provided to assist the disk in moving over its center—that is, when the armature is substantially in its central position.

Referring to Figs. 8, 9, 10, 11, and 12, in which the indicator is shown in detail and in which the controller, indicator, and locking mechanisms are shown in relation to each other, it will be seen that the parts heretofore described, together with the indicator, may be mounted upon a suitable frame or stand H, which is preferably constructed to contain suitable resistance, (indicated in a general way at $h$.) In Figs. 11 and 12 the apparatus illustrated is designed for the operation of four switches, and therefore it has four controllers, four locking devices, and upon the indicating-board K, which is mounted upon said frame, so as to be clearly visible to the operator, there are the representation of two parallel tracks $k$, three sidings, and a crossover $k'$ and four switch mechanisms 1, 2, 3, and 4, respectively. Adjacent to each representation of a switch, which consists of a straight arm $k^3$, is a lamp $k^2$, which is on a circuit $g^3$, Fig. 1, and thus burns when the corresponding switch is incompletely or improperly thrown. For moving the arms $k^3$ two pairs of magnets $k^4$ and $k^5$, respectively, are provided for each arm, each set of magnets being arranged as shown in Figs. 8, 9, and 10. Between the magnets is a short shaft $k^6$, carrying on its upper end the arm $k^3$ and upon its lower end an X-shaped armature $k^7$. The two arms or members of this armature are arranged at less than a right angle to each other, so both arms cannot lie at the same time in lines between the poles of the two pairs of magnets, respectively. In this way, as will be obvious, the energization of each pair of magnets alternately will cause the armature and the attached arm $k^3$ to be turned first in one direction and then in the other direction. A spring $k^8$ is also preferably provided and is secured to an arm $k^9$ upon the shaft $k^6$ in order to assist the armature over its center, and stop-pins $k^{10}$ limit the movement on each side of this arm $k^9$, and therefore of the armature.

In the operation of the system the operator stands in front of the controlling mechanism and indicating-board (shown in Figs. 11 and 12) and by depressing the controllers $d$ is able to actuate the several switches controlled thereby at will. As has already been explained, if he attempts to operate one of the switches while a car is passing over the same he is prevented from so doing by the operation of the corresponding locking device E, which for the time being prevents the depression by him of the corresponding controller. Before him upon the indicating-board the positions of all the switches are indicated, and it is also clear to him from the lamps thereon whether or not all of the switches have been properly thrown or are in an intermediate position. In this way it will be obvious one operator may be able to control a large number of switches from one place.

It will be obvious that many changes may be made in the construction of the apparatus and also in the arrangement of the different parts of the system without avoiding the spirit and scope of the invention, and the invention is therefore not considered to be limited to the precise arrangement and structures shown and described herein.

I claim as my invention—

1. In a system of electrically-operating railroad-switches, the combination of means for operating a switch-point, an operating-lever at a distance from said means, a lock for the lever, and means adapted to be operated by the car to actuate the lock.

2. In a system of electrically-operating railroad-switches, the combination of an operating-lever, an electric lock for the lever, two contacts arranged near the switch and adapted upon the passage of a car over the switch to close a current first through the lock to lock the lever and then through the lock to unlock the lever.

3. In a system of electrically-operating railroad-switches, the combination of an operating-lever, an electric lock for the lever, a current-main and two contacts near the main on each side of the switch respectively, and electrically connected with the lock whereby the trolley or contact-plate of a car passing through the switch may connect the main with the lock first through one contact to lock the lever and then through the other contact to unlock the lever.

4. In a system of electrically-operating railroad-switches, the combination of an operating-lever, an electric lock for the lever having two magnets, a current-main, a contact near the main on one side of the switch and electrically connected with one magnet, and a contact near the main on the other side of the switch and electrically connected with the other magnet, whereby the trolley or contact-plate of a car passing through the switch may effect the operation of one magnet to lock the lever and then of the other magnet to unlock the lever.

5. In a system of electrically-operating railroad-switches, the combination of an operating-lever, an electric lock for the lever having two magnets with their poles substantially at right angles to each other and a disk carrying a crescent-shaped armature mounted to rotate between the poles, a current-main, a contact near the main on one side of the switch and electrically connected with one magnet, and a contact near the main on the other side of the switch and electrically connected with the other magnet, whereby the trolley or contact-plate of a car passing through the switch may effect the operation of one magnet to lock the lever and then of the other magnet to unlock the lever.

6. In a system of electrically-operating railroad-switches, the combination of an operating-lever, means operated thereby to throw a switch and an indicating-board having means to indicate the location of the switch in its two limiting positions and in an intermediate position, said means being electrically connected with the said mechanism.

7. In a system of electrically-operating railroad-switches, the combination of an indicating-board, switch mechanism including a lever for throwing the switch and contacts electrically connected with the indicating-board and adapted to coöperate with the lever to close circuits through the indicating-board to indicate the position of the switch.

8. In a system of electrically-operating railroad-switches, the combination of an indicating-board having means to indicate the location of a switch in its two limiting positions and in an intermediate position, switch mechanism including a lever for throwing the switch and three contacts electrically connected respectively with the indicating means for the different positions of the switch, said lever being adapted to close a circuit through each one of said contacts, the particular contact through which the circuit is closed at any given moment depending upon the position of the lever.

9. In a system of electrically-operating railroad-switches, the combination of an indicating-board having thereon the representation of a track, a switch, electrical means to move said switch and a signal, switch mechanism including a lever, and three contacts connected respectively with said electrical means and the signal, said lever being adapted to close a circuit through each one of said contacts, and the particular contact through which the circuit is thus closed at any given moment depending upon the position of the lever.

10. In a system of electrically-operating railroad-switches, the combination of an operating-lever, means operated thereby to throw a switch, a lock for the lever, means adapted to be operated by the car to actuate the lock, and an indicating-board near the lever to show the position of the switch.

11. In a system of electrically-operating railroad-switches, the combination of an operating-lever, means operated thereby to throw a switch including a second lever, a lock for the operating-lever, means adapted to be operated by the car to actuate the lock, an indicating-board near the operating-lever having means to indicate the location of the switch in its two limiting positions, and two contacts electrically connected respectively with the indicating means, said second lever being adapted to close a circuit through each of said contacts and the particular contact through which the circuit is thus closed at any given moment depending upon the position of the switch.

12. In a system of electrically-operating railroad-switches, an indicator for showing the position of a switch, said indicator having two pairs of magnets and an X-shaped armature whereby the energization of either pair of magnets turns the armature so that one of its straight members lies in a line across the poles of that pair of magnets.

13. In a system of electrically-operated railroad-switches, an indicator for showing the position of a switch, said indicator having two pairs of magnets, an X-shaped pivoted armature and a spring connected to the armature so as to assist in turning the armature on its pivot, whereby the energization of either pair of magnets turns the armature so that one of its straight members lies in a line across the poles of that pair of magnets and whereby the spring tends to hold the armature in its turned position.

14. In a system of electrically-operating railroad-switches, the combination of an indicator for showing the position of a switch, said indicator having two pairs of magnets and an X-shaped armature, two contacts electrically connected respectively with each pair of magnets and means operatively connected with the switch to close a circuit through the contacts and their respective pairs of magnets, the particular contact through which the circuit is closed depending upon the position of the switch.

15. In a system of electrically-operating railroad-switches, an electric switch having two terminals, a plunger, and two pivoted arms adapted to contact respectively with the terminals and the ends of which are engaged by the plunger.

16. In a system of electrically-operated railroad-switches, an electric switch having two terminals and a spring-actuated plunger, two pivoted arms adapted to contact respectively with the terminals and the ends of which are engaged by the plunger, and a spring connecting said arms.

17. In a system of electrically-operating railroad-switches, an electric switch comprising a box for containing oil, two terminals adapted to extend into the oil, a plunger, a lever pivoted thereto for actuating the same, two pivoted arms adapted to contact respectively with the terminals and the ends of which are engaged by the plunger.

This specification signed and witnessed this 22d day of June, 1905.

ALDRED K. WARREN.

In presence of—
ANTHONY N. JESBERA,
LUCIUS E. VARNEY.